United States Patent
Sulser et al.

(10) Patent No.: US 9,115,232 B2
(45) Date of Patent: Aug. 25, 2015

(54) POLYMER MADE FROM MALEIC ACID, ALLYL ETHER, AND VINYL ACETATE AND THE PREPARATION AND USE OF SAID POLYMER

(75) Inventors: Ueli Sulser, Unterengstringen (CH); Lukas Frunz, Zurich (CH); Joerg Zimmermann, Winterthur (CH)

(73) Assignee: SIKA TECHNOLOGY AG, Baar (CH)

( * ) Notice: Subject to any disclaimer, the term of this patent is extended or adjusted under 35 U.S.C. 154(b) by 54 days.

(21) Appl. No.: 13/990,584

(22) PCT Filed: Dec. 20, 2011

(86) PCT No.: PCT/EP2011/073418
§ 371 (c)(1),
(2), (4) Date: May 30, 2013

(87) PCT Pub. No.: WO2012/084954
PCT Pub. Date: Jun. 28, 2012

(65) Prior Publication Data
US 2013/0253097 A1    Sep. 26, 2013

(30) Foreign Application Priority Data
Dec. 24, 2010    (EP) .................................... 10196978

(51) Int. Cl.
| | |
|---|---|
| *C08F 22/02* | (2006.01) |
| *C04B 24/26* | (2006.01) |
| *C08F 220/28* | (2006.01) |
| *C08F 222/06* | (2006.01) |
| *C08F 216/14* | (2006.01) |
| *C04B 103/00* | (2006.01) |
| *C04B 103/40* | (2006.01) |

(52) U.S. Cl.
CPC .............. *C08F 22/02* (2013.01); *C04B 24/267* (2013.01); *C04B 24/2688* (2013.01); *C08F 216/1416* (2013.01); *C08F 220/28* (2013.01); *C08F 222/06* (2013.01); *C04B 2103/006* (2013.01); *C04B 2103/408* (2013.01)

(58) Field of Classification Search
USPC ................................ 526/204, 211, 227, 318.2
See application file for complete search history.

(56) References Cited

U.S. PATENT DOCUMENTS 6,388,038 B1    5/2002 Hirata et al.

FOREIGN PATENT DOCUMENTS

| EP | 0 798 320 A2 | 10/1997 | |
| EP | JP 2004-137130 | * 5/2004 | .............. C04B 24/32 |
| JP | A 2004-137130 | 5/2004 | |

OTHER PUBLICATIONS

Jun. 25, 2013 Translation of International Preliminary Report on Patentability issued in International Patent Application No. PCT/EP2011/073418.
Verlag; "Initiatoren [Initiators];" CD Römpp Chemie Lexikon [Römpp's Chemical Lexicon]; Stuttgart 1995; 9$^{th}$ edition; version 1.0.
Feb. 7, 2012 Search Report issued in International Patent Application No. PCT/EP2011/073418 (with translation).
Jul. 3, 2014 Office Action issued in Columbian Application No. 13-139738-2 (with English translation).

* cited by examiner

*Primary Examiner* — Robert Harlan
(74) *Attorney, Agent, or Firm* — Oliff PLC

(57) ABSTRACT

The invention relates to comb polymers made from maleic acid or derivatives thereof, allyl ethers, and vinyl acetate, and the preparation thereof by free-radical polymerization at a reaction temperature of 10° C. to 50° C. The invention relates further to the use of such comb polymers to improve the workability of hydraulically setting compositions.

19 Claims, No Drawings

POLYMER MADE FROM MALEIC ACID, ALLYL ETHER, AND VINYL ACETATE AND THE PREPARATION AND USE OF SAID POLYMER

TECHNICAL FIELD

The present invention relates to additives for hydraulically setting systems, in particular dispersants for concrete compositions.

PRIOR ART

Polymers made from maleic acid or derivatives thereof and allyl ethers have been used for quite some time in concrete technology as plasticizers because of their water reduction. When such polymers are added to hydraulically setting compositions such as cement, the amount of water can be reduced, which is advantageous for the stability of the concrete. These polymers have a comb polymer structure. In the prior art, substantially temperatures above 60° C. are used for preparing generic comb polymers, for example, in U.S. Pat. No. 6,388,038 B1.

A particular problem with known plasticizers based on comb polymers is that the long-term workability declines rapidly with time, so that the hydraulically setting compositions are only poorly workable after a short time.

DESCRIPTION OF THE INVENTION

The object of the present invention therefore is to provide polymers which are made from maleic acid or derivatives thereof and allyl ethers and do not have the above-described disadvantages. New plasticizers based on maleic acid or derivatives thereof and allyl ethers for use in hydraulically setting compositions are to be provided, which have special and advantageous properties. The polymers should exhibit an improved plasticizing action in hydraulically setting compositions. The problem particularly underlying the invention is to provide polymers that enable hydraulically setting compositions to have a good long-term workability.

Surprisingly it was now found that polymers according to claim 1 and polymers prepared by a method according to claim 6 attain said object. Such polymers in hydraulically setting compositions result both in an improvement in the long-term workability and also in an improvement of the water reduction.

Other aspects of the invention are the subject of other independent claims. Especially preferred embodiments of the invention are the subject of the dependent claims.

APPROACHES FOR CARRYING OUT THE INVENTION

The present invention relates to a polymer P comprising:
a. m mol % of at least one structural unit A of the formula (I);

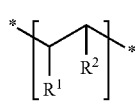

b. n mol % of at least one structural unit B of the formula (II);

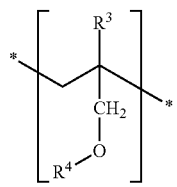

c. o mol % of at least one structural unit C of the formula (III);

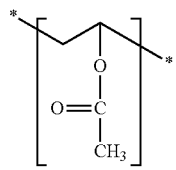

and optionally
d. p mol % of at least one further structural unit D;
where $R^1$ and $R^2$ in this respect independently of one another each stand for $COO^-M$ or $COOR^4$,
$R^3$ stands for H or $CH_3$,
$R^4$ stands for

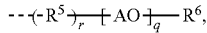

$R^5$ stands for an alkylene group having 1 to 6 C atoms,
$R^6$ stands for H, an alkyl group, preferably having 1 to 20 C atoms, an alkylaryl group, preferably having 7 to 20 C atoms;
wherein substituent A independently of one another stands for a C2 to C4 alkylene group, the subscript q represents a value of 2 to 300, particularly of 2 to 50, and the subscript r represents a value of 0 to 1;
wherein M=cation, preferably $H^+$, an alkali metal ion, alkaline earth metal ion, a bivalent or trivalent metal ion, $NH_4^+$, or an organic ammonium, particularly preferably $H^+$, $Na^+$, $Ca^{++}/2$, $Me^{++}/2$, $NH_4^+$, or an organic ammonium;
wherein m, n, o, p independently of one another are numbers, whereby the sum m+n+o+p=100, and m>0, n>0, o>0 and p≤0; and
wherein
m=20-85, preferably 30-60, particularly preferably 45-55,
n=10-50, preferably 20-35, particularly preferably 25-30,
o=5-50, preferably 10-30, particularly preferably 12.5-25,
p=0-20, preferably 0-10.

The term "polymer" in the present document comprises, on the one hand, a population of chemically uniform macromolecules, differing, however, in terms of the degree of polymerization, molecular weight, and chain length, prepared by a polyreaction (polymerization). The term comprises, on the other hand, also derivatives of such a population of macromolecules from polyreactions, therefore compounds obtained by reactions such as, for example, additions or substitutions, of functional groups on specified macromolecules and may be chemically uniform or chemically non-uniform.

The term "comb polymer" in the present document is understood to be a comb polymer consisting of a linear polymer chain (=main chain) to which side chains are bound via ester or ether groups. The side chains in this regard form the "teeth" of a "comb," metaphorically speaking.

It is clear to the person skilled in the art that COO⁻M, on the one hand, is a carboxylate to which the ion M is bound, and that, on the other, in the case of polyvalent ions M the charge must be balanced by counterions.

The designations in bold such as P, A, A', B, B', C, C', D, D', and the like in the present document serve only for better reading comprehension and identification.

The structural unit D typically concerns units arising by polymerization of ethylenically unsaturated carboxylic acids or derivatives thereof, particularly salts, anhydrides, esters, or amides thereof.

Examples of suitable structural units D are units arising by polymerization of mesaconic acid, citraconic acid, glutaconic acid, fumaric acid, maleamic acid, itaconic acid, vinylbenzoic acid, crotonic acid, or anhydrides of the aforementioned acids or derivatives thereof, particularly the salts, anhydrides, esters, or amides thereof. Preferred are monocarboxylic acids, or derivatives thereof, particularly salts, anhydrides, esters, or amides thereof.

It can be advantageous further, if polymer P has less than 5 mol % of structural unit D, particularly no structural unit D.

Polymer P preferably has an average molecular weight $M_n$ of 500-200,000 g/mol, preferably 5000-70,000 g/mol, particularly preferably 15,000-50,000 g/mol.

It is advantageous further, if polymer P has a ratio m/(n+o+p) of 0.5-2.5, particularly 0.8-1.2.

Preferably the ratio m/o is 2.5-4 in polymer P. A ratio m/o of 2.5-4 is of advantage in that especially good results for increasing the long-term workability of hydraulically setting compositions are achieved.

A ratio m/o of 1.5-3 is of advantage in that especially good results for increasing the flow table spread are achieved immediately after addition in hydraulically setting compositions.

In a preferred embodiment polymer P comprises:
30-60 mol %, preferably 45-55 mol % of structural unit A of the formula (I);
20-35 mol %, preferably 25-30 mol % of structural unit B of the formula (II);
10-30 mol %, preferably 12.5-25 mol % of structural unit C;
in each case based on the total molar amount of the structural units of A, B, and C in polymer P.

In an especially preferred embodiment, polymer P consists of more than 95% by weight, preferably more than 98% by weight, of the aforementioned structural units of A, B, and C with the molar % ratios previously mentioned as preferred. Polymer P can therefore have, in addition to the structural units of A, B, and C, still further structural units, which, for example, arise from molecular weight modifiers.

In another preferred embodiment, in polymer P
$R^1$ and $R^2$ each stand for COO⁻M;
$R^3$ stands for H;
$R^4$ stands for

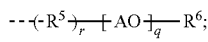

$R^5$ stands for an alkylene group having 1 to 6 C atoms;
$R^6$ stands for H, an alkyl group, preferably having 1 to 20 C atoms, $R^6$ especially stands for CH₃;
substituent A independently of one another stands for a C2 to C4 alkylene group, the subscript q for a value of 2 to 300, particularly 2 to 50;

the subscript r stands for a value of 0 to 1, particularly 0;
M=cation, preferably H⁺, an alkali metal ion, alkaline earth metal ion, a bivalent or trivalent metal ion, NH₄⁺, or an organic ammonium, particularly preferably H⁺, Na⁺, Ca⁺⁺/2, Mg⁺⁺/2, NH₄⁺, or an organic ammonium;
m=30-60, preferably 45-65;
n=20-35, preferably 25-30;
o=10-30, preferably 12.5-25;
p=0-10, preferably 0.

In another aspect, the present invention relates to a method for preparing a polymer P, as was described above.

In a preferred embodiment, the method for preparing a polymer P is a method for preparing a polymer P comprising the step of free-radical polymerization of:

i) mol % of at least one compound A', which is a maleic anhydride or a compound of the formula (IV);

ii) n' mol % of at least one compound B' of the formula (V);

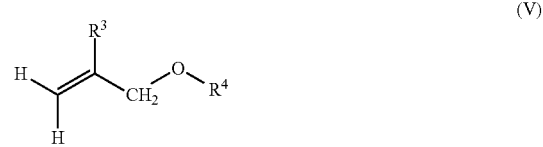

iii) o' mol % of at least one compound C' of the formula (VI);

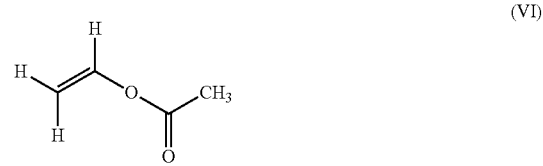

and optionally
iv) p' mol % of at least one further compound D';
where $R^1$ and $R^2$ in this respect independently of one another each stand for COO⁻M or COOR⁴
where $R^3$ stands for H or CH₃
where $R^4$ stands for

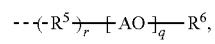

$R^5$ stands for an alkylene group having 1 to 6 C atoms,
$R^6$ stands for H, an alkyl group, preferably having 1 to 20 C atoms, an alkylaryl group, preferably having 7 to 20 C atoms;
wherein substituent A independently of one another stands for a C2 to C4 alkylene group, the subscript q represents a value of 2 to 300, particularly of 2 to 50, and the subscript r represents a value of 0 to 1;

wherein M=cation, preferably H⁺, an alkali metal ion, alkaline earth metal ion, a bivalent or trivalent metal ion, NH₄⁺, or an organic ammonium, particularly preferably H⁺, Na⁺, Ca⁺⁺/2, Mg⁺⁺/2, NH₄⁺, or an organic ammonium;

wherein m', n', o', p' independently of one another are numbers, whereby the sum m'+n'+o'+p'=100, and m'>0, n'>0, o'>0 and p'≥0; and wherein
m'=20-85, preferably 30-60, particularly preferably 45-55,
n'=10-50, preferably 20-35, particularly preferably 25-30,
o'=5-50, preferably 10-30, particularly preferably 12.5-25,
p'=0-20, preferably 0-10,
in the presence of an initiator for free-radical polymerizations at a reaction temperature of 10° C. to 50° C., preferably of 15° C. to 35° C.

The term "initiator for free-radical polymerizations" or "free-radical initiator" in the present document is understood to be a compound as it is described as an initiator in CD Römpp Chemie Lexikon [Römpp's Chemical Lexicon], 9$^{th}$ edition, version 1.0, Georg Thieme Verlag, Stuttgart 1995, suitable for free-radical polymerizations.

It can be advantageous further, if the method has further iv) p'mol % of at least one other compound D'.

Preferably, compounds D' are compounds that afford structural units by polymerization, as they were mentioned above as preferred structural units D.

It can also be advantageous, however, if less than 5 mol % of a further compound D', particularly no compound D', is used.

Preferably, the ratio m'/(n'+o'+p) is between 0.5 and 2.5.

In a preferred embodiment, following amounts of compounds A', B', and C' are employed:
30-60 mol %, preferably 45-55 mol % of compound A' of the formula (IV);
20-35 mol %, preferably 25-30 mol % of compound B' of the formula (V);
10-30 mol %, preferably 12.5-25 mol % of compound C' of the formula (VI);
in each case based on the total molar amount, used during preparation, of compounds A', B', and C'.

In another preferred embodiment, in the process:
R¹ and R² each stand for COO⁻M;
R³ stands for H;
R⁴ stands for

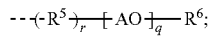

R⁵ stands for an alkylene group having 1 to 6 C atoms;
R⁶ stands for H, an alkyl group, preferably having 1 to 20 C atoms, R⁶ especially stands for CH₃;
substituent A independently of one another stands for a C2 to C4 alkylene group, the subscript q stands for a value of 2 to 300, particularly 2 to 50;
the subscript r stands for a value of 0 to 1, particularly 0;
M=cation, preferably H⁺, an alkali metal ion, alkaline earth metal ion, a bivalent or trivalent metal ion, NH₄⁺, or an organic ammonium, particularly preferably H⁺, Na⁺, Ca⁺⁺/2, Mg⁺⁺/2, NH₄⁺, or an organic ammonium;
m'=30-60, preferably 45-65;
n'=20-35, preferably 25-30;
o'=10-30, preferably 12.5-25;
p'=0-10, preferably 0.

Preferably, polymer P prepared by the method of the invention has an average molecular weight $M_n$, as it was described as preferable above.

The method takes place in the presence of an initiator for free-radical polymerizations at a reaction temperature of 10° C. to 50° C., preferably 15° C. to 35° C. A reaction temperature of this type is of advantage in that here no oxidative damage to the forming polymers occurs, which has a negative effect on improving the long-term workability of hydraulically setting compositions, which can be achieved with the aid of the polymers. Further, such a reaction temperature is conducive to the use of vinyl acetate, because thereby despite the low boiling point of vinyl acetate the reaction typically need not be carried out under pressure. Further, such a low reaction temperature in an aqueous solvent has the result that the poorly water-soluble vinyl acetate, which at temperatures above 50° C. would homopolymerize to a great extent, surprisingly reacts to a great extent with compound A', or compound B', or compound D'.

Preferably, the initiator for free-radical polymerizations is a redox system-based initiator or a UV-based initiator. This is of advantage in that such systems at temperatures of 10° C. to 50° C., preferably 15° C. to 35° C., contribute efficiently to the formation of radicals.

Preferably, the initiator for free-radical polymerizations is a redox system-based initiator. Particularly preferably, the redox system-based initiator comprises a reducing agent and a radical former, whereby the reducing agent is selected from the group consisting of sodium hydroxymethanesulfinate (rongalite), alkali metal sulfites, metabisulfites, ascorbic acid, and ketoenols, and the radical former is preferably a peroxide compound, for example, hydrogen peroxide or sodium peroxide.

Preferably, the initiator is used in the ratio of 0.05 to 20% by weight, preferably 0.01 to 10% by weight, particularly preferably in the ratio of 0.1 to 2% by weight, based on the total weight of the sum of the compounds A', B', C' and optionally D'.

If the reaction takes place in an aqueous solvent, particularly in water, preferably initiators are used that are readily soluble in water.

The initiator can be added to the reaction in different ways over the course of the free-radical polymerization. It can be added both entirely to the reaction vessel and also according to its consumption continuously or stepwise over the course of the polymerization. Preferably, the initiator is added continuously to the polymerization mixture during the free-radical polymerization.

Preferably, the free-radical polymerization is carried out at a pH of 2-4. This is of advantage because hydrolysis cleavage of compound B' is largely prevented by this.

It is advantageous, further, if the free-radical polymerization is carried out in emulsion, in bulk, or in solution, preferably in solution, particularly preferably in aqueous solution, most preferably in water. Aqueous solutions are advantageous for a later use to extend the workability of hydraulically setting compositions, if they are to be used as a liquid product.

It can be advantageous further to carry out the polymerization reaction so that compound C' is added continuously to the reaction over the duration of the polymerization reaction.

Polymers P, prepared by the above-described production method based on free-radical polymerization at a reaction temperature of 10° C. to 50° C., have the advantage that because of a uniform incorporation of compound A', compound B', compound C', and optionally compound D', comb polymers with very different and advantageous structures and properties can be obtained compared with comb polymers prepared by production methods based on free-radical polymerization at a reaction temperature above 60° C. It was determined surprisingly that during use of polymers P, prepared by the method of the invention, especially advantageous properties are achieved, whereby particularly the workability of hydraulically setting compositions such as cement compositions is improved immediately after addition and/or for longer time periods. The different properties are probably obtained because of the different distributions of the side chains in polymer P.

The term "hydraulically setting binders" in the present document is understood to be compounds as they are described in CD Römpp Chemie Lexikon, $9^{th}$ edition, version 1.0, Georg Thieme Verlag, Stuttgart 1995, which harden in the presence of water, also with exclusion of oxygen, such as, for example, under water.

The term "hydraulically setting composition" is understood to be compositions containing hydraulically setting binders. Suitable compositions and binders are known to the person skilled in the art in the field of construction chemistry. In a preferred embodiment of the invention, the hydraulically setting binder is selected from the group consisting of cement and quicklime.

Customary cements are, for example, Portland cements or alumina cements and their respective mixtures with customary additives. Cement is especially preferred as the hydraulically setting binder.

The hydraulically setting compositions may contain customary additives, such as fly ash, fumed silica, slag, slag sand, and limestone filler. Furthermore, aggregates such as sand, gravel, stones, quartz powder, or chalk are possible and as additives common components such as plasticizers, for example, lignosulfonates, sulfonated naphthalene-formaldehyde condensates, sulfonated melamine-formaldehyde condensates, or polycarboxylate ethers, accelerators, corrosion inhibitors, retardants, shrinkage reducing agents, antifoaming agents, or pore formers.

In another aspect, the invention relates to a hydraulically setting composition containing at least one polymer P, as they are described as polymers P above.

Polymer P can be used as dispersants or as components of a dispersant. Such a dispersant comprises at least one polymer P. The dispersant may contain additional components. Examples of additional components are additives, such as plasticizers, for example, lignosulfonates, sulfonated naphthalene-formaldehyde condensates, sulfonated melamine-formaldehyde condensates, or polycarboxylate ethers (PCE), accelerators, retardants, shrinkage reducing agents, pore formers, or antifoaming agents. Typically, in this case the proportion of polymer P is 5 to 100% by weight, particularly 10 to 100% by weight, based on the total weight of the dispersant.

Polymer P may be used particularly as a plasticizer or as a water reducer to improve the workability and/or to improve the flowability of the hydraulically setting compositions prepared therewith.

A further aspect of the invention therefore relates to the use of at least one polymer P, as they are described above, for improving the workability of hydraulically setting compositions.

In the use according to the invention, the hydraulically setting compositions exhibit an extended workability. This means that the composition after addition of water and dispersants, containing polymer P, remains workable for a relatively long time, in comparison with compositions not containing polymer P, or in comparison with compositions containing other water-reducing additives such as, for example, customary plasticizers. The comparison occurs, for example, so that the compositions without polymer P or with customary plasticizers initially have the same water/cement value (w/c value) in the case of a comparable initial flow table spread, which is established by the dosing amount of the comparison plasticizer. The flow table spread of hydraulically setting compositions, containing polymer P, does not decline substantially or declines only slightly preferably after a specific time, for example, after 30 minutes or after 60 minutes, so that the change between the initial flow table spread and the flow table spread after 30 minutes, preferably even after 60 minutes, is as small as possible.

The long-term workability is improved in particular in the use according to the invention. The long-term workability can be determined via the flow table spread according to EN 1015-3. Preferably, the workability is improved after more than 30 minutes and/or after more than 60 minutes, in each case after addition of water. Preferably, the workability is also improved at the time after 30 minutes and/or after 60 minutes, in each case after addition of water.

In a preferred embodiment of the invention, the flow table spread of the hydraulically setting composition, particularly a cement-containing hydraulically setting composition, measured according to EN 1015-3, declines by less than 10%, preferably by less than 5%, particularly preferably does not decline after 30 minutes (after addition of water).

In another preferred embodiment of the invention, the flow table spread of the hydraulically setting composition, particularly a cement-containing hydraulically setting composition, measured according to EN 1015-3, declines by less than 20%, preferably by less than 10%, and particularly preferably by less than 6% after 60 minutes (after addition of water).

The subject of the invention is also a method for preparing a hydraulically setting composition with an extended workability, whereby a hydraulically setting binder, water, and a polymer P are combined. Polymer P is a polymer P, as they were described above.

Polymer P is preferably used in an amount of 0.01 to 5% by weight, particularly 0.05 to 2% by weight, or 0.1 to 1% by weight, based on the weight of the hydraulically setting binder. Polymer P can be added separately or premixed as a dispersant in solid or liquid form. The dispersant is preferably used in liquid form, particularly as an aqueous solution.

Polymer P or the dispersant can also be used in the solid aggregate state, for example, as a powder, flakes, pellets, granules, or plates. Such solid additives may be easily transported and stored. In the solid aggregate state, polymer P may be a component of a so-called dry mixture, for example, a cement composition, which is storable for an extended period and is typically packed in bags or stored in silos and used. Such a dry mixture may also be used after an extended period of storage and has good pourability.

Polymer P may be added to a hydraulically setting composition together with or shortly before or shortly after the addition of water. Adding polymer P in the form of an aqueous solution or dispersion, in particular as mixing water or as part of the mixing water, has proven particularly suitable. The aqueous solution or dispersion is prepared, for example, by adding water during the preparation of polymer P or by subsequent mixing with water. A dispersion or a solution forms depending on the type of polymer P, whereby a uniform solution is preferred.

EXAMPLES

1. Preparation of Polymers

Examples P-1-P-4 according to the invention

Thus, for example, polymer P-1 of the invention was prepared by placing 250 g of water, 69.6 g of maleic acid (0.6 mol), 330 g of an allyl polyethylene glycol (Polyglycol A 1100, Clariant) with an average molecular weight of 1100 g/mol (0.3 mol), 26 g of vinyl acetate (0.3 mol), 1.5 g of a 10% aqueous solution of Fe (II)-$SO_4$ $7H_2O$, and 2 g of sodium hypophosphite in a reaction vessel with a stirrer.

Next 10 g of a 35% aqueous hydrogen peroxide solution and 4 g of a 5% aqueous rongalite solution were added dropwise at a temperature of 20° C. to 35° C. for a period of 70 minutes with stirring.

120 minutes after the start of the dropwise addition, a clear viscous polymer solution was obtained, which was then partially neutralized with a 50% sodium hydroxide solution. Polymers P-2 to P-4 were prepared in the same manner as polymer P-1 in accordance with the information given in Table 1.

Comparative Example V-1

320 g of water, 76.6 g of maleic acid (0.66 mol), and 330 g of an allyl polyethylene glycol (Polyglycol A 1100, Clariant) with an average molecular weight of 1100 g/mol (0.3 mol) were placed in a reaction vessel with a stirrer.

Next, 19 g of ammonium persulfate dissolved in 100 g of water was added dropwise at a temperature of 75° C. to 80° C. for 4 hours with stirring.

240 min after the start of the dropwise addition, a clear viscous polymer solution was obtained, which was then partially neutralized with a 50% sodium hydroxide solution.

Table 1: Polymers P-1 to P-4 of the invention or comparative polymer V-1 contain structural units A of the formula (I) and structural units B of the formula (II), or polymers P-1 to P-4, in addition to structural unit C of the formula (III), with $R^1$=COOM, $R^2$=COOM, $R^3$=H, $R^4$=—($CH_2$—$CH_2O)_{ca.25}$—$CH_3$, M=H+, Na+; mol % stands for the mol % of the individual structural units m, n, o based on the total molar amount of the structural units of A, B, and C, in the end polymer.

Fe(II) stands for a 10% aqueous solution of Fe(II)-$SO_4$ $7H_2O$, (molecular weight) modifier stands for sodium hypophosphite, $H_2O_2$ stands for a 35% aqueous hydrogen peroxide solution, and rongalite stands for a 5% aqueous rongalite solution.

| Polymer | Mol % | Mw (g/mol) | Charge (g) | Feed (g) | Feed time (min) |
|---|---|---|---|---|---|
| P-1 | m = 25<br>n = 50<br>o = 25 | ca. 30,000 | Water 250,<br>Fe(II) 1.5,<br>modifier 2 | $H_2O_2$ 10,<br>rongalite 4/ | 70 |
| P-2 | m = 30<br>n = 50<br>o = 20 | ca. 30,000 | Water 250,<br>Fe(II) 1,<br>modifier 2 | $H_2O_2$ 10,<br>rongalite 4 | 95 |
| P-3 | m = 36<br>n = 50<br>o = 14 | ca. 35,000 | Water 650,<br>Fe(II) 4,<br>modifier 4 | $H_2O_2$ 42,<br>rongalite 13 | 210 |
| P-4 | m = 38<br>n = 50<br>o = 12 | ca. 25,000 | Water 250,<br>Fe(II) 1,<br>modifier 2 | $H_2O_2$ 12,<br>rongalite 4.5 | 150 |
| V-1 | m = 33<br>n = 67<br>o = — | ca. 25,000 | Water 320 | Ammonium persulfate in water, 119 | 240 |

2. Cement Tests

The effectiveness of the polymers of the invention was tested in cement. 29.5 g of mixing water, in which 0.5 g of a 30% aqueous solution of a polymer P-1, P-2, P-3, or P-4 of the invention or the comparative polymer V-1 was dissolved, was added to 100 g of cement (Schweizer CEM I 42.5) within 30 seconds and mixing in a tumbling mixer continued for 2 minutes. The total wet mixing time was 2 minutes. The water/cement value (w/c value) was 0.3.

The flow table spread of the thus prepared cement compositions ZZ-P-1, ZZ-P-2, ZZ-P-3, ZZ-P-4, and ZZ-V-1 was determined according to EN 1015-3.

TABLE 2

Flow table spread (FTS) in cm after 30 seconds (sec)

| No. | Additive | FTS (cm) after 30 sec |
|---|---|---|
| ZZ-P-1 | P-1 | 76 |
| ZZ-P-2 | P-2 | 90 |
| ZZ-P-3 | P-3 | 80 |
| ZZ-P-4 | P-4 | 74 |
| ZZ-V-1 | V-1 | 63 |

The results in Table 2 show that cement compositions with the polymers P-1-P-4 of the invention have excellent plasticizing properties in comparison with the cement composition with the customary polymer V-1, as is reflected in the values of the flow table spread after 30 seconds. Especially good results were achieved with polymers P-2 and P-3. In other words, especially good results for plasticizing are achieved immediately after addition in the cement compositions, if the polymer has a ratio m/o of 1.5-3.

3. Mortar Tests

The effectiveness of the polymers according to the invention was tested in mortar.

| Composition of the mortar mixture (MM):<br>(maximum particle size of 8 mm) | Quantity |
|---|---|
| Cement (Schweizer CEM I 42.5) | 750 g |
| Limestone filler | 141 g |
| Sand 0-1 mm | 738 g |
| Sand 1-4 mm | 1107 g |
| Sand 4-8 mm | 1154 g |

The sand, filler, and cement were mixed dry for 1 minute in a Hobart mixer. The mixing water, in which 2.25 g of polymer P-3 or P-4 of the invention or a comparative polymer V-1 was dissolved, was added within 30 seconds and mixing was continued for another 2.5 minutes. The total wet mixing time was 3 minutes. The water/cement value (w/c value) was 0.41.

The flow table spread of the mortar was determined according to EN 1015-3.

TABLE 3

Flow table spread (FTS) in cm after 0, 30, and 60 minutes (min)

| | | FTS (cm) | | |
|---|---|---|---|---|
| No. | Additive | 0 min | 30 min | 60 min |
| MZ-P-3 | P-3 | 215 | 216 | 202 |
| MZ-P-4 | P-4 | 199 | 222 | 190 |
| MZ-V-1 | V-1 | 172 | 165 | 153 |

The results in Table 3 show that the polymers of the invention have excellent plasticizing properties compared with the conventional polymer V-1. This is shown primarily by the values of the flow table spread immediately after addition of the polymer, where the polymers of the invention achieve a much better plasticizing effect than the comparative polymer, and after 30 to 60 minutes, where the flow table spread with polymers P-3 and P-4 remains relatively constant for 60 minutes and declines at most 6% versus the initial flow table spread after 0 minutes.

The invention claimed is:

1. A polymer P comprising:
m mol % of at least one structural unit A of the formula (I);

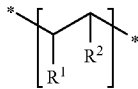
(I)

n mol % of at least one structural unit B of the formula (II);

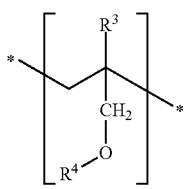
(II)

o mol % of at least one structural unit C of the formula (III);

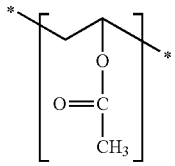
(III)

and optionally
p mol % of at least one further structural unit D;
where $R^1$ and $R^2$ in this respect independently of one another each stand for $COO^-M$ or $COOR^4$,
$R^3$ stands for H or $CH_3$,
$R^4$ stands for

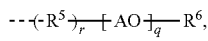

$R^5$ stands for an alkylene group having 1 to 6 C atoms,
$R^6$ stands for H, an alkyl group, or an alkylaryl group;
wherein substituent A independently of one another stands for a C2 to C4 alkylene group, the subscript q represents a value of 2 to 300, and the subscript r represents a value of 0 to 1;
wherein M=cation, preferably $H^+$, an alkali metal ion, alkaline earth metal ion, a bivalent or trivalent metal ion, $NH_4^+$, or an organic ammonium;
wherein m, n, o, p independently of one another are numbers, whereby the sum m+n+o+p=100, and m>0, n>0, o>0 and p≥0; and
wherein
m=20-85
n=10-35
o=12.5-50
p=0-20.

2. The polymer P according to claim 1, wherein the polymer P has an average molecular weight $M_n$ of 15,000-50,000 g/mol.

3. The polymer P according to claim 1, wherein the polymer P has a ratio m/(n+o+p) of 0.5-2.5.

4. The polymer P according to claim 1, wherein the polymer P has a ratio m/o of 2.5-4.

5. The polymer P according to claim 1, wherein the polymer P has a ratio m/o of 1.5-3.

6. A method for preparing a polymer P according to claim 1.

7. The method according to claim 6, comprising the step of the free-radical polymerization of:
i) m' mol % of at least one compound A', which is a maleic anhydride or a compound of the formula (IV);

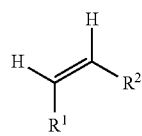
(IV)

ii) n' mol % of at least one compound B' of the formula (V);

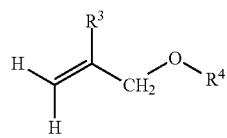
(V)

iii) o' mol % of at least one compound C' of the formula (VI);

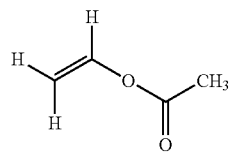
(VI)

and optionally
iv) p' mol % of at least one further compound D';
where $R^1$ and $R^2$ in this respect independently of one another each stand for $COO^-M$ or $COOR^4$,
where $R^3$ stands for H or $CH_3$,
where $R^4$ stands for

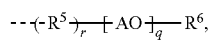

$R^5$ stands for an alkylene group having 1 to 6 C atoms,
$R^6$ stands for H, an alkyl group, or an alkylaryl group;
wherein substituent A independently of one another stands for a C2 to C4 alkylene group, the subscript q represents a value of 2 to 300, and the subscript r represents a value of 0 to 1;
wherein M=cation, preferably $H^+$, an alkali metal ion, alkaline earth metal ion, a bivalent or trivalent metal ion, $NH_4^+$, or an organic ammonium;

wherein m', n', o', p' independently of one another are numbers, whereby the sum m'+n'+o'+p'=100, and m'>0, n'>0, o'>0 and p'≥0; and wherein
m'=20-85
n'=10-35
o'=12.5-50
p'=0-20;

in the presence of an initiator for free-radical polymerizations at a reaction temperature of 10° C. to 50° C., preferably of 15° C. to 35° C.

8. The method according to claim 7, wherein the initiator for free-radical polymerizations is a redox system-based initiator.

9. The method according to claim 8, wherein the redox system-based initiator comprises a reducing agent and a radical former, whereby the reducing agent is selected from the group consisting of sodium hydroxymethanesulfinate (rongalite), alkali metal sulfites, metabisulfites, ascorbic acid, and ketoenols, and the radical former is a peroxide compound.

10. The method according to claim 7, wherein the ratio m'/(n'+o'+p') is between 0.5 and 2.5.

11. The method according to claim 7, wherein the free-radical polymerization is carried out at a pH of 2-4.

12. A method for improving the workability of hydraulically setting compositions comprising adding at least one polymer P according to claim 1 into a hydraulically setting composition.

13. The method according to claim 12, wherein the flow table spread of the hydraulically setting composition, measured according to EN 1015-3, declines by less than 10% after 30 minutes.

14. A hydraulically setting composition containing at least one polymer P according to claim 1.

15. A method for preparing a hydraulically setting composition with extended workability, whereby a hydraulically setting binder, water, and a polymer P according to claim 1 are combined.

16. The polymer P according to claim 1,
wherein when $R^6$ is an alkyl group, the alkyl group has 1 to 20 C atoms, and
wherein when $R^6$ is an alkylaryl group, the alkylaryl group has 7 to 20 C atoms.

17. The method according to claim 7,
wherein when $R^6$ is an alkyl group, the alkyl group has 1 to 20 C atoms, and
wherein when $R^6$ is an alkylaryl group, the alkylaryl group has 7 to 20 C atoms.

18. The polymer P according to claim 1,
wherein when M is an alkali metal ion, the alkali metal ion is $Na^+$,
wherein when M is an alkaline earth metal ion, alkaline earth metal ion is at least one selected from the group consisting of $Ca^{++}/2$, $Mg^{++}/2$, and
wherein when M is a bivalent or trivalent metal ion, the bivalent or trivalent metal ion is $NH_4^+$.

19. The method according to claim 7,
wherein when M is an alkali metal ion, the alkali metal ion is $Na^+$,
wherein when M is an alkaline earth metal ion, alkaline earth metal ion is at least one selected from the group consisting of $Ca^{++}/2$, $Mg^{++}/2$, and
wherein when M is a bivalent or trivalent metal ion, the bivalent or trivalent metal ion is $NH_4^+$.

* * * * *